July 1, 1930.　　　F. W. COFFING　　　1,769,333
PORTABLE GUY CLAMP
Filed Aug. 24, 1928
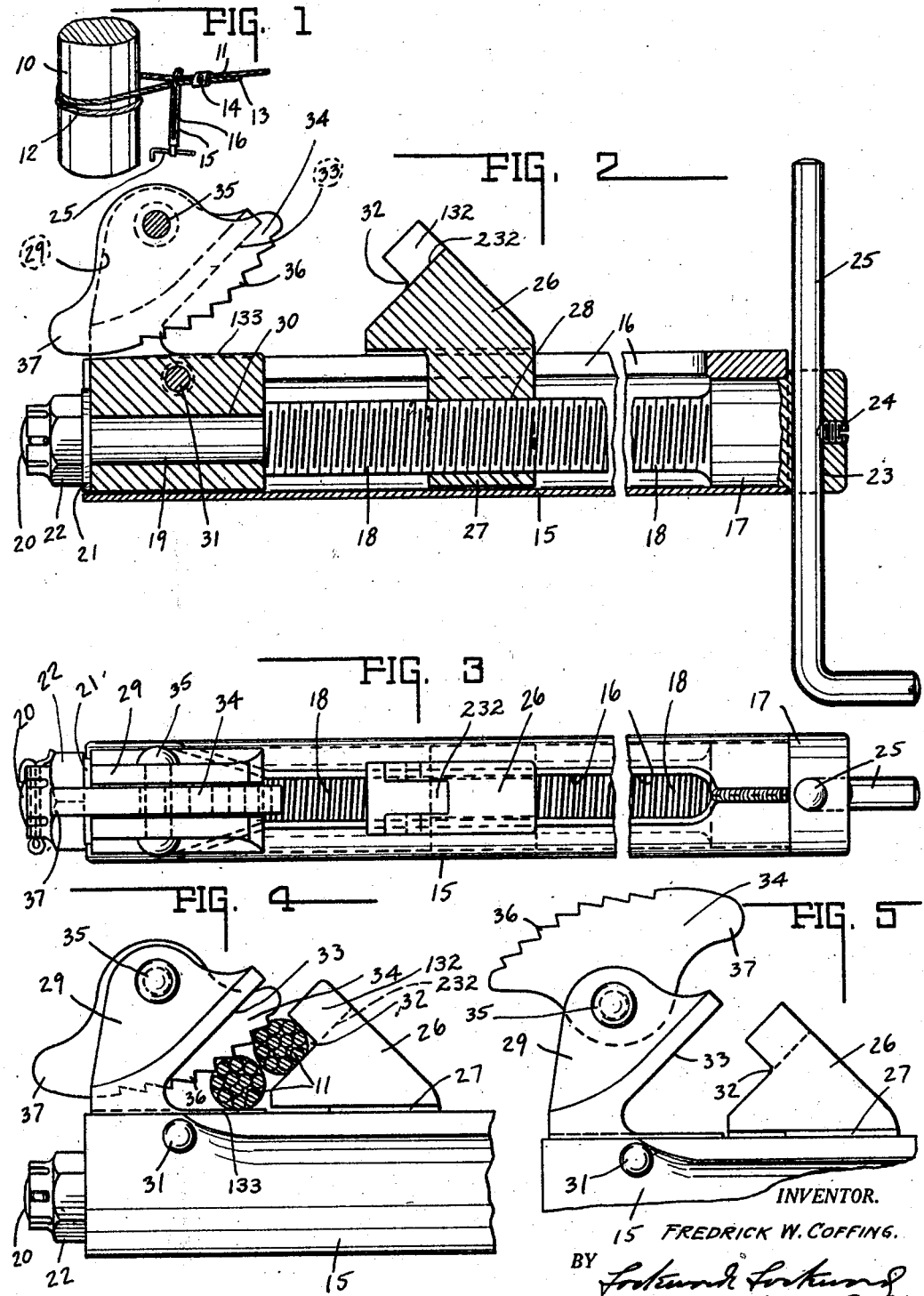
INVENTOR.
FREDRICK W. COFFING.
BY
ATTORNEYS.

Patented July 1, 1930

1,769,333

UNITED STATES PATENT OFFICE

FREDRICK W. COFFING, OF PERRYSVILLE, INDIANA

PORTABLE GUY CLAMP

Application filed August 24, 1928. Serial No. 301,769.

This invention relates to a wire, rope or cable clamp, and portable vise, such as set forth and described in my copending application Serial No. 277,749, filed May 14, 1928.

The principal object of the invention resides in the provision of a ratchet tooth wedge associated with one of the clamping jaws, against which the wire or cable is adapted to be forced by the opposing clamping jaw in such manner as to actuate the wedge so as to increase the gripping action of the clamp and hold the cable firmly wedged as well as clamped thereby.

Another feature of the invention resides in the mounting of the wedge upon the clamping jaw in such manner that it may be swung out of operative position so that the jaws may be readily used without the wedge when desired.

The full nature of the invention will be understood from the accompanying drawings and the following description and claims:

In the drawings, Fig. 1 is a perspective view of the device associated with a looped cable for drawing the looped portion thereof together. Fig. 2 is a longitudinal sectional view through the clamp. Fig. 3 is a plan view looking down on the clamp. Fig. 4 is a partial view showing the wedge in operative engagement with the cable. Fig. 5 is a partial view of the clamp with the wedge in inoperative position.

In the drawings there is shown a post 10 about which is looped a wire or cable 11 having a looped portion 12 and a free end portion 13. In mounting wires or cable upon fencing, telegraph poles or the like, it is customary to loop the wire about the post and secure it by a clamp 14. After the wire has been pulled taut to as great an extent as is possible by a suitable wire tightening or tensioning device, the loop around the anchor 10 is twisted to increase the tension and take up the last remaining slack. This is accomplished by gripping the two ends of the loop where they meet and drawing the same together. The present device is intended to be employed for that purpose. After the loop has been closed by drawing the ends together, an additional clamp is added to maintain the wire in that condition.

As shown herein, the clamping device includes a tube 15 having an elongated slot 16 extending substantially throughout its length. The tube 15 forms at one end thereof a bearing for the body portion 17 of the screw shaft 18. Said screw shaft extends through the tube and has a reduced cylindrical portion 19 which is threaded on its end at 20 to receive a washer 21 and nut 22. Said screw shaft projects beyond the other end of the tube and is transversely apertured as at 23 and provided with a locking screw 24 for securing in the aperture the handle 25.

A cable clamping jaw 26, provided with a body portion 27, is slidably mounted in the tube 15 so as to protrude through the slot 16 therein. Said jaw is internally threaded as at 28 to receive the screw shaft 18. Rotation of the screw shaft by the handle 25, therefore, will cause axial reciprocation of the jaw relative to the screw and tube.

Fixedly mounted within the tube 15 and projecting therefrom there is a fixed jaw 29 which is secured in place by the pin 31 and has a body portion within the tube which acts as a bearing, as indicated at 30, for the screw shaft. Said screw shaft is rotatably mounted at 19 in said bearing, but is maintained against longitudinal movement with respect thereto. The movable jaw 26 is provided with a gripping recess as indicated at 32 formed by the upwardly angularly directed spaced projections 132 having the groove 232 therebetween. The fixed jaw 29 is provided with a downwardly and rearwardly extending gripping surface 33 and a ledge portion 133. Said jaw 29 is bifurcated to receive therebetween the cam-like wedge 34 which is pivoted therein at 35 and provided with the ratchet teeth or suitably serrated surface 36. Extending rearwardly from said wedge, when in normal position, there is provided a tail 37 which may be manually engaged to throw the wedge upwardly out of operative position, as illustrated in Fig. 5. The pivotal mounting of said wedge is such that it normally remains in operative position by gravity, although a suitable spring may be employed if desired for that purpose.

The width of the wedge cam is slightly less than the width of the slot 232 so that the projections 132 may straddle the cam 34 when the two jaws are positioned in their closest relationship.

It will be noted that by reason of the above construction, upon the jaw 26 moving the cable into engagement with the wedge 34, said cable will engage the teeth 36 thereof and force the same rearwardly about the pivotal mounting 35. Said action will turn the wedge 34 about its pivotal mounting so that the forward toothed face thereof will be brought downwardly into cable clamping position. Thus, in addition to the clamping action effected by the movement of the jaw 26, there will be a wedging action caused by the camlike wedge 34 and the gripping action caused by the teeth 36 thereon. If it is desired to employ merely the clamping jaws without the wedge 34, the tail 37 thereof may be swung upwardly about the pivotal mounting out of the way of the clamping action. In addition to the device being employed as a cable clamp, it may be used as a clamp or vise for other articles as well.

The invention claimed is:

1. In a vise the combination of a jaw including two surfaces angular to each other and inclined to the line of jaw movement, a wedging cam cooperating therewith for increasing the pressure upon movement of said jaw toward said cam and a stationary surface for work clamping association with the cam and the angular surfaces of said jaw.

2. In a vise the combination of a jaw including two surfaces angular to each other and inclined to the line of jaw movement, a wedging cam cooperating therewith for increasing the pressure upon movement of said jaw toward said cam, a stationary surface for work clamping association with the cam and the angular surfaces of said jaw, means pivotally supporting said wedging cam and straddling the same and a pair of spaced projections arranged to straddle said cam when the jaw and cam are positioned in the closest relationship, portions of said projections providing one of said angular surfaces.

3. In a vise the combination of a movable jaw including two article engageable surfaces angular of each other, an article engageable surface and a cam wedge including an article engagement surface progressively engageable thereby for progressively article clamping in the jaw movement.

In witness whereof, I have hereunto affixed my signature.

FREDRICK W. COFFING.